United States Patent [19]

Nabha et al.

[11] Patent Number: 4,947,092
[45] Date of Patent: Aug. 7, 1990

[54] SOLID STATE WINDSHIELD WASH AND WIPE CONTROLLER

[75] Inventors: Ali M. Nabha, Dearborn; John C. Dock, Rochester, both of Mich.

[73] Assignee: Chrysler Corporation, Highland Park, Mich.

[21] Appl. No.: 457,119

[22] Filed: Dec. 26, 1989

[51] Int. Cl.$^5$ ............................................. B60S 1/08
[52] U.S. Cl. ................................. 318/444; 318/443; 318/434; 318/DIG. 2; 318/281
[58] Field of Search .............. 318/256, 257, 268, 269, 318/281, 362, 375, 379, 434, 443, 444, DIG. 2

[56] References Cited

U.S. PATENT DOCUMENTS

| 3,675,103 | 7/1972 | Elliott | 318/DIG. 2 X |
| 3,849,711 | 11/1974 | Elliott et al. | 318/443 |
| 4,158,798 | 6/1979 | Holt | 318/444 |
| 4,314,186 | 2/1982 | Gille et al. | 318/434 |
| 4,663,575 | 5/1987 | Juzswik et al. | 318/444 |
| 4,705,997 | 11/1987 | Juzswik | 318/443 X |
| 4,825,134 | 4/1989 | Tracht | 318/443 |

Primary Examiner—Bentsu Ro
Attorney, Agent, or Firm—Wendell K. Fredericks

[57] ABSTRACT

A wiper controller, responsive to any of a plurality of wash and wipe conditions, causes a short circuit protection circuit to inhibit control if the wiper motor becomes shorted. Hysteresis is employed for comparator operation of an intermittent wipe circuit that enables suitable short circuit protection.

10 Claims, 4 Drawing Sheets

SOLID STATE WINDSHIELD WASH AND WIPE CONTROLLER

BACKGROUND OF THE INVENTION

1. Field of the Invention:

This invention relates to a windshield wiper control system, more particularly to a control system containing solid state motor driving and braking control along with associated short circuit and transient protection for a plurality of modes of operation of the windshield wipers.

2. Prior Art:

In turning on the windshield wiper motor, various reference voltages throughout the controller system are disturbed. The disturbance often causes the input voltage to the motor drivers to oscillate causing erratic motor operations. If a short circuit protection circuit connects in the path of the motor current, generally this circuit also will act erratic and respond in a manner that inhibits motor operation.

U.S. Pat. No. 4,705,997 of D. L. Juzswik dated Nov. 10, 1987 entitled "Bidirectional Motor Drive Circuit" teaches a motor drive circuit that may include transient protection circuits, but the protection circuit operates to prevent voltage transients greater than a predetermined amplitude from being passed to the drive circuitry; i.e., at least the high-side power FETS are selected to have a minimum breakdown voltage which is at least twice the amplitude of the transient protection. Such an arrangement appears to provide adequate protection but it requires sizing FET parameters to anticipate transient voltages.

Another control circuit is described in U.S. Pat. No. 4,825,134 dated Apr. 25, 1989 of Tracht entitled "Intermittent Wiper Control Circuit With Instant Wipe". In this patent, a voltage comparison arrangement provides a first wipe capability for an intermittent wipe cycle. The comparators employed provide control signals to operate relays used to activate the wiper motor. The comparator arrangement doesn't appear to place limitations on the design of the wiper circuit but it does appear to lack transient combating circuits which oppose transients caused by the switching ON and OFF and reversing direction of motor currents.

Realizing the various problems associated with switching OFF and ON signals to induction-type motors, a search for various means to provide a plurality of controls for controlling the operation of the wiper motor and at the same time guarantee snap-action switching of the various controls with protection from transients and short circuits. This search resulted in the improved windshield wash and wipe controller of the present invention.

SUMMARY OF THE INVENTION

The invention discloses a solid state motor drive system with short circuit protection, independent wipe and wash cycle and mist circuits, and a time delay between two wipes control circuit that includes regeneration added to a comparator circuit to guarantee snap-action switches from delay and rest positions of the wipers.

The short circuit protection circuit permits using conventional DRIVER and PARKING FET's which are called into action upon receipt of short circuits or transients in the load currents. Also, reverse battery protection is provided that operates upon peak transient signals yet does not reduce the applied motor voltage during normal operation.

BRIEF DESCRIPTION OF THE DRAWING FIGURES

FIG. 3 (a-e) are timing diagrams describing the operation of the time delay between two wipes circuit comparator and the short circuit protection circuit; and FIG. 4 (a-g) are timing diagrams describing the operation of the time delay between two wipes circuit, the wiper motor, the wiper motor switch, the PARKING FET, and the short circuit protection.

DETAILED DESCRIPTION OF A PREFERRED EMBODIMENT

Figure 1:
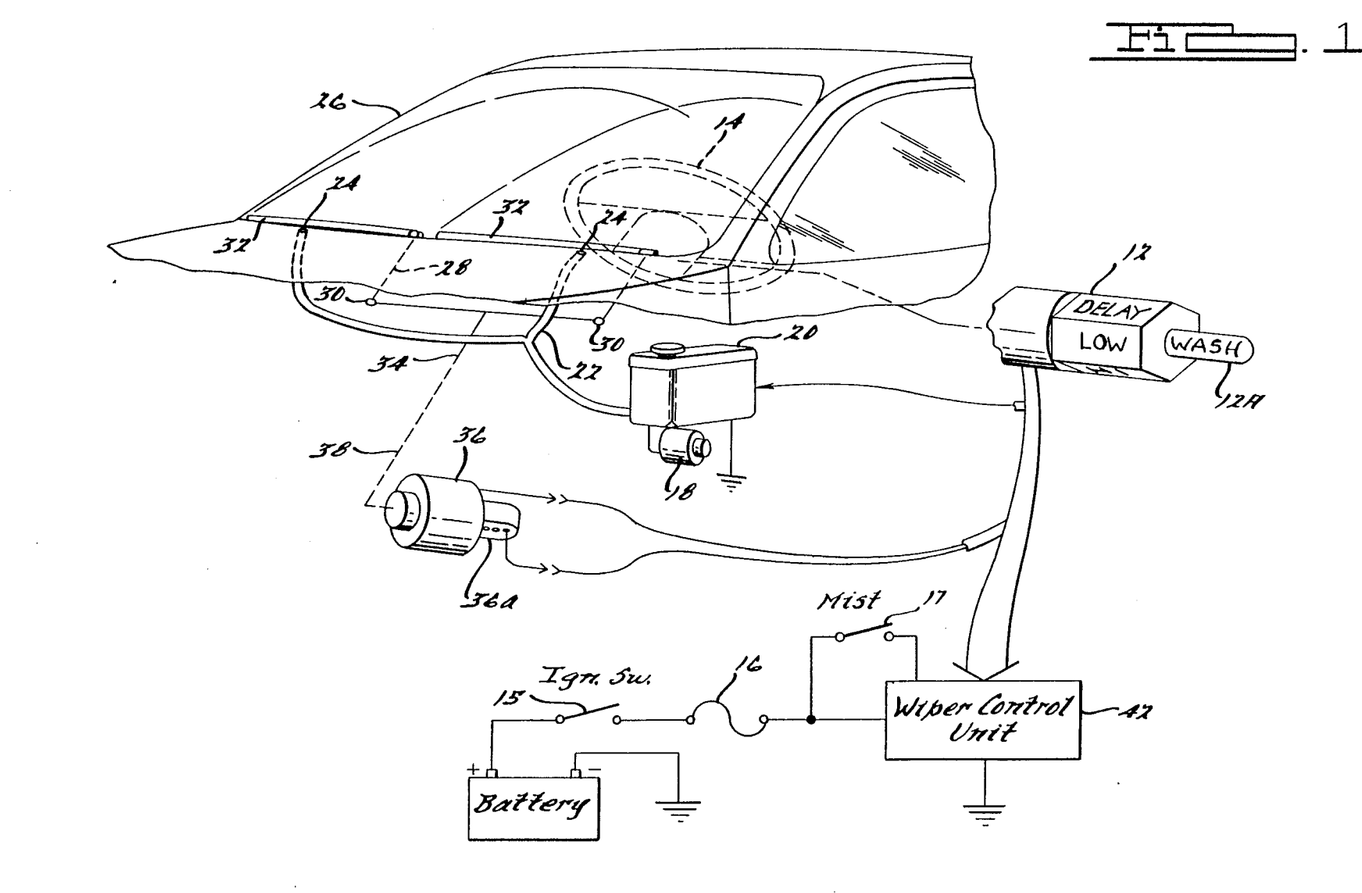
FIG. 1 illustrates in a partial pictorial, partial schematic diagram of a wiper controller system.

FIG. 1 illustrates, in partial pictorial, partial schematic diagram, a solid state wiper controller system 10. A column switch 12, which may mount off the steering wheel column or on a dashboard, permits selecting six operating modes; namely, OFF, DELAY, LOW, HIGH, WASH and MIST. The first position places the system in the OFF mode; next provides an elongated slide contact for the delay or dwell wipe, with counter-clockwise rotations in this embodiment reducing the delay time; low speed results at the next detent position. HIGH speed occurs at the full clockwise detent position.

In any mode, pressing a wash pushbutton 12A completes a windshield wash and wipe circuit. The windshield wipers and the washer operate with the column switch mode circuits after turning an ignition switch 15 to accessory or ignition position. With the ignition switch on, power reaches system 10 through fuse 16. The washer circuit includes a washer motor fluid pump 18 mounted directly to a reservoir 20. Fluid, gravity fed from the reservoir, gets forced by pump 18 through a nozzle system 22 which directs streams of fluid to the windshield 26.

The mist mode operates when momentarily closed switch 17 is pressed and then released. Wiper motor 36 operates to cause a single wipe of the windshield.

In addition to column switch 12, the wiper circuit includes left and right wiper arm and blade assemblies 28 which oscillate from a park position over an arcuate path across windshield 26. A connecting link 34 permits a conventional two-speed, two-brush wiper motor 36 to drive both wiper arm and blade assemblies simultaneously by a drive link connected between the wiper motor 36 and the connecting link 34.

Figure 2:
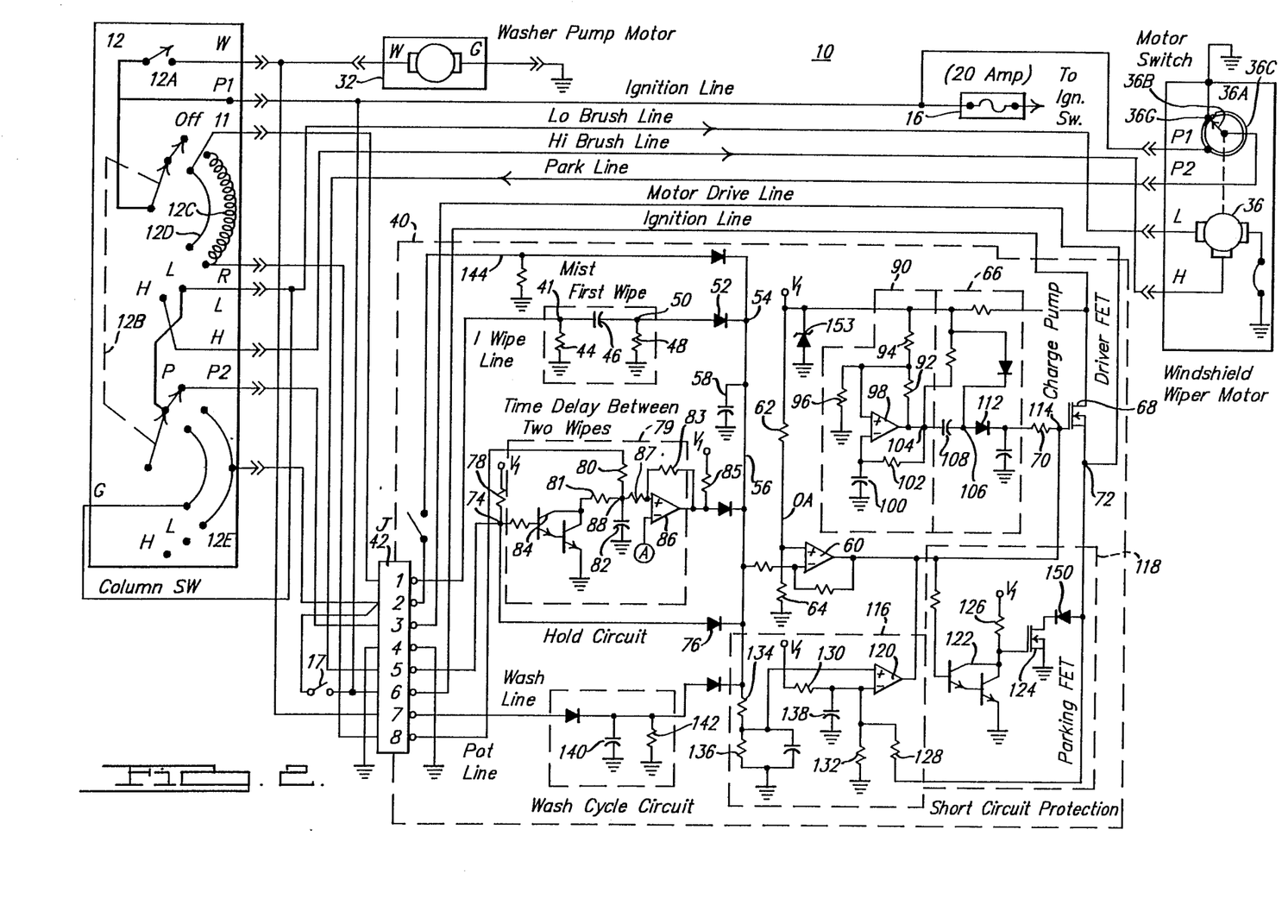
FIG. 2 depicts a schematic diagram of the windshield wash and wipe controller system.

Mechanically connected to a rotor of the wiper motor 36, a motor switch 36A, best illustrated in FIG. 2, mechanically and electrically tracks the movement of the wiper arm and blade assemblies. When the wiper arm and blade assemblies find the park position 32 of FIG. 1 or cause wiper arm 36B to move to ground terminal 36G, a ground signal from motor switch 36A routes to wiper control unit 20. Movement of the wiper and arm and blade assemblies away from the park position generates an ignition voltage level signal from a circular post 36C of motor switch 36A to unit 40 over a park switch interconnecting line, best seen in FIG. 2. Both voltage level signals provide wiper blade tracking signals to unit 40. The wiper control unit 40 provides timing and control signals using the tracking signals for controlling the operation of the wiper arm and blade assemblies during the OFF mode and intermittent wiper delay modes.

DELAY MODE—INTERMITTENT WIPING OF WINDSHIELD

Referring to FIG. 2, the wiper arm and blade assemblies go into intermittent wipe operations when placing the column switch 12 in the delay mode. In the delay mode, the operator can vary the time that the wiper arm and blade assemblies are in the park or rest position from, e.g., 1 to 18 seconds. Intermittent wiping always occurs in the LOW speed mode. Column switch 12 has the rotatable sleeve potentiometer or (POT) 12C that outputs current from terminal R in response to the position of a sliding lever arm 12B of switch 12. The sliding lever arm 12B of switch 12 carries ignition voltage from fuse 16. Simultaneous with moving arm 12B to a position along potentiometer 12C, arm 12B maintains contact with a semicircle post 12D. Post 12D outputs ignition voltage from terminal 11 to pin 1 of jack J42 to the intermittent wiper control unit 40.

Circuits in unit 40 connect between terminals of column switch 12 and terminals of park switch 36A to effect intermittent wiping of windshield. From switch 12, ignition voltage from terminal 11 routes to an I-WIPE or PARK line via pin 1 of J42 of unit 40 and the motor drive line connected to pin 2 of terminal J42 respectively. The potentiometer current routes from terminal R to a POT line connected to terminal 8 of J42.

FIRST WIPE CIRCUIT

During intermittent wipe operations, periodic pulses of a chosen pulse width and pulse repetition period, depending on the level of current from potentiometer 12C, drives and controls the delay/at-rest time of wiper motor 36. Because of the delay between pulses, a need exists for providing an undelayed initial pulse that adds and integrates in with the periodic pulses.

With the column switch in the delay position, the signal on the park line going to terminal 5 of unit 40 has a potential of 0 volt and the signal on the PARK line going to terminal 1 goes to the ignition voltage. Current flows from terminal 1 to junction 21. From junction 41, current flows along two paths. First, the current flows through current limiting resistor 44 to ground to effect some degree of noise immunity. Additionally, resistor 44 rapidly discharges an RC circuit capacitor 46 when the operator turns system 10 OFF. This discharging of capacitor 46 enables system 10 for the next time the operator turns ON system 10. The discharge path is through resistor 44, capacitor 46 and resistor 48. Secondly, current flows to an RC circuit comprised of capacitor 46 and resistor 48 connected in series across the voltage from POT 12C. At the first instance, all the POT voltage is across resistor 48 since capacitor 46 acts like a short due to the change in voltage from POT 12C and initially there is 0 voltage across capacitor 46. As capacitor 46 charges, a voltage builds up across it. At the same time, current through the circuit and the voltage across resistor 48 both decay. The build up of the voltage across capacitor 46 and the decay of the voltage across resistor 48 both take place in an exponential manner. The output of the RC circuit at junction 50 forward biases diode 52 and places the voltage that appears across resistor 48 at junction 54.

Near junction 54, from a point on a diode bus 56, a noise immunity capacitor 58 connects across bus 56 to ground. A plus (+) terminal of capacitor 58 accumulates a positive charge until its capacity is met.

Also connected to diode bus 56 at junction 58, a voltage comparator 60 determines whether the voltage from the bus which routes to a non-inverting terminal is greater than a potential difference (PD) which is approximately ½ of the ignition voltage applied to the inverting input. The PD at the inverting input comes from a voltage divider formed from resistors 62 and 64. If the bus voltage is the higher of the two voltages, then the output of comparator 60 will be an open circuit. Comparator 60, being an open collector comparator, causes the output to go to ground if the diode bus voltage is less than the voltage at the inverting input.

During this first wipe operation, with the output of comparator 60 open, an output voltage signal of approximately two times the ignition voltage from a charge pump circuit 66 applies to the gate of a conventional DRIVER FET 68 through resistor 70. The operation of charge pump 66 will be described infra.

With DRIVER FET 68 ON, ignition voltage passes from a drain terminal and out of a source terminal, then through junction 72. From junction 72, the ignition voltage goes to the motor drive line which routes the voltage to pin 3 of J42. From pin 3 of J42, the ignition voltage routes to column switch 12, terminal 12E, and then through the wiper arm 12B to terminal G; and then the voltage routes over the low brush line to the low brush terminal L of windshield wiper motor 36 to cause motor 36 to operate.

Returning now to the RC circuit, after motor 36 operates, the decaying voltage across resistor 48 of the first wipe RC circuit approaches zero. The diode bus 31 will go to a voltage level below that of the inverting input of comparator 60 causing the output to go to ground. In order to keep the diode bus voltage above the voltage level at the inverting terminal of comparator 60, a hold circuit is employed.

Since wiper motor 36 is mechanically linked to motor park switch 36A when motor 36 is turned ON, the wiper 36B of the motor park switch rotates from the ground post 36G to the arcuate ignition posts 36C causing ignition voltage to be routed from the motor park switch over the park line to terminal 5 of J42 of the wiper control unit 40. From terminal 5 of J42, the ignition voltage routes to junction 74 and then on through a conventional diode 76 to the diode bus 56 maintaining the diode bus voltage greater than the potential difference at the inverting input of comparator 60. This operation completes the first wipe.

When wiper motor 36 operates, the wiper arm of the motor park switch which is mechanically linked to the rotor motor 36 moves over the circular ignition posts 36C and the ground post 36G which is spaced apart from the ends of post 36C. As wiper arm 36B rotates, it abruptly switches from the ground post 36G to the circular ignition post 36C presenting a "make-before-break" situation at both interfaces. The make-before-break circumstances occur on the hold line used to maintain the polarity of the diode bus 56 higher than inverting input of comparator 60. To counteract the effects of the make-before-break conditions, a pull-up resistor 78 is disposed between a voltage source V1 which is substantially equivalent to the ignition voltage at junction 74. Resistor 78 connected at junction 74 and capacitor 58 connected to diode bus 56 performs a low pass filter function which filters out frequencies above a chosen rate established by the movement of the park switch wiper arm 36B.

When the wiper arm 36B rotates to the ground post 36G of the motor park switch, diode bus 56 goes LOW and PARKING FET 124 turns ON to brake motor 36.

TIME DELAY BETWEEN TWO WIPES

The time delay between two wipes circuit 79 controls the delay/at-rest time of the motor 36 during the intermittent wipe or delay mode. The delay will be proportional to the position of the potentiometer 12C and will range, illustratively, from one second to eighteen seconds. This circuit is initiated when the motor park switch wiper arm 36B passes over the ground post 36G. The potentiometer 12C on the column switch 12 forms part of the resistance of the RC timing circuit consisting of resistor 80 and capacitor 82. While the wiper arm of the motor park switch 36B is at post 36G, the first-wipe circuit described supra is inhibited, the PARKING FET 124 turns ON and the DRIVE FET 68 turns OFF. The diode bus 56 goes to a high potential difference when capacitor 82 charges up to about one-half the ignition voltage through resistor 80 and potentiometer 12C of column switch 12.

While the motor park switch wiper arm is at ground post 36G, junction 74 is near a ground potential and Darlington transistor 84 is cut off. Capacitor 82 continues charging towards the ignition voltage. When the voltage difference across capacitor 82 reaches approximately one-half the ignition voltage, the output of comparator 86 opens. At this time, the potential difference across diode bus 56 goes to approximately the ignition voltage causing the output comparator 60 to open which turns the DRIVER FET 68 ON.

Capacitor 58, that connects across bus 29, compensates for any noise generated by the wiper arm 36B traveling over ground post 36G.

When the proper time delay occurs and the wiper arm 36B of the motor park switch moves over to the circular voltage post 36C, junction 74 obtains a potential difference of approximately the ignition voltage thus biasing ON Darlington transistor 84. When transistor 84 conducts, junction 88 of the RC circuit becomes a ground potential junction causing the non-inverting input of comparator 86 to have a voltage lower than the inverting input causing the output to go to a ground potential inhibiting the operation of the time delay between two wiper circuits. Potential difference of capacitor 82 decays and the HOLD circuit turns ON. The next timing cycle begins when the HOLD circuit output causes bus 56 to return to ground.

SQUARE WAVE GENERATOR AND CHARGE PUMP CIRCUITS

Connected between the DRIVER FET 68 and the ignition line, square-wave generator 90 provides a pulse repetition rate (PRR) for a square wave signal of about 40 kilohertz with a pulse width of approximately 50 microseconds. A voltage divided network consisting of the parallel combination of resistors 96 and 92 in series with resistor 94 couples a reference voltage of approximately two-thirds of the ignition voltage to the non-inverting input of comparator 98. The voltage at the inverting terminal of comparator 98 will be near zero. Further, capacitor 100 will start charging towards the reference voltage via resistor 102 which has one end connected to junction 104 which is at approximately the ignition voltage. When the potential difference across capacitor 100 reaches approximately two-thirds of the ignition voltage, the output of comparator 98 switches regeneratively to ground. Hence, junction 104 goes to a ground potential. Prior to the switching, junction 106 is at the ignition voltage. When junction 104 becomes a ground potential, the potential difference across capacitor 108 will jump to the stored charge value on capacitor 108 plus the ignition voltage at junction 106. Hence, this high voltage will apply to the gate of DRIVER FET 68 via the half-bridge rectifier 110 and the resistor 70, turning on the DRIVER FET 68 and causing the ignition voltage to be applied to the motor drive line.

When junction 104 goes to a ground potential, capacitor 108 starts to discharge through resistor 102 until the current through resistor 102 falls slightly below that defined by the parallel combination of resistor 96 and 92 in series with resistor 94. Resistors 96 and 92 are place in parallel by junction 104 being grounded. Hence, the potential difference across the non-inverting terminal of comparator 98 falls to approximately one-third of the ignition voltage. When capacitor 100 discharges to the point where the potential difference across the inverting terminal of comparator 98 falls below one-third of the ignition voltage, the output of comparator 98 will switch regeneratively to approximately the ignition voltage. This oscillation of the output continues at a repetition frequency of about 40 kilohertz continuously as long as the ignition voltage is applied to the square wave generator 90 and the output of the charge pump is applied to junction 114 at the gate of DRIVER FET 68. The higher frequency of the square wave generator allows the charge pump 66 to use small capacity capacitors which charge up to approximately twice the ignition voltage during the regenerative switching to ground of the square wave generator output signal.

SHORT CIRCUIT PROTECTION CIRCUIT AND PARKING FET CIRCUIT

The PARKING FET circuit 118 causes the motor drive line to go to a ground potential to cut off the wiper motor when the column switch 12 is switched off, when the wiper arm 36B rotates to ground post 36G or when a short circuit protection circuit 116 is activated. The short circuit protection circuit 116 connects between diode bus 56 and the gate of DRIVER FET 68. The PARKING FET circuit 118 connects between the gate of DRIVER FET 68 and the source of DRIVER FET 68.

The short circuit protection circuit 116 contains a comparator 120 in which the inverting input connects to the diode bus 56 via a resistor capacitor network while the non-inverting input connects to the source terminal of DRIVER FET 68 through a second resistor capacitor network. If the voltage at the inverting input is greater than the voltage at the non-inverting input, then the output of comparator 120 will go to a ground potential inhibiting DRIVER FET 68. At this ground potential, a Darlington transistor 122 will also be inhibited allowing ignition voltage to be applied to the gate of a PARKING FET 124 turning on FET 124 through resistor 126 and causing the source of DRIVER FET 68 to be grounded inhibiting wiper motor 36 by grounding the Motor Drive Line.

During normal operation, when wiper motor 36 operates, the source voltage of DRIVER FET 68 goes to the ignition voltage via the Ignition Line. Hence, resistors 128 and 130 are essentially in parallel in respect to the ignition voltage and this parallel combination is in series with resistor 132. Hence, illustratively, if resistor 128 and resistor 130 are 56k and 110k respectively, the parallel resistance would equal 37k. Then the potential difference at the non-inverting input of comparator 120 would see a potential difference of about ¾ of the ignition voltage. Illustratively, if resistors 134 and 136 are 110k respectively, the potential difference across the inverting input of comparator 120 will be approximately one-half the ignition voltage. Hence, the output of comparator 102 will be open and the potential difference at the gate of DRIVER FET 68 will be the output of charge pump 66.

If the source of DRIVER FET 68 was less than half the ignition voltage or at ground potential, resistor 128 would be essentially parallel with resistor 132 and the potential difference across the non-inverting input of comparator 120 would be approximately one-quarter the ignition voltage. Under these conditions, the inverting input potential difference will be greater than the non-inverting input. Hence, the output of comparator 120 will go to a ground potential. When the output goes to the ground potential, the gate of DRIVER FET 68 goes to ground and the Darlington transistor 122 will cut off and the source of DRIVER FET 68 will go to ground.

If the charge pump feeds the gate of DRIVER FET 68 while the potential across the non-inverting input of comparator 128 is approximately one-quarter the ignition voltage while bus 56 voltage is high, the gate of DRIVER FET 68 will be shorted to ground and the capacitor 138 connected to the non-inverting input of comparator 120 will charge at a rate ten times faster than the capacitor connected to the inverting input. This action causes the output of the comparator 120 to open and the output of the charge pump to go to the base of Darlington transistor 122 turning it on which, in turn, shorts out the gate of the PARKING FET 124, removing the ground from the source terminal of DRIVER FET 68.

If the short continues on the source terminal of DRIVER FET 68, then the non-inverting input of comparator 120 will return to a voltage which is about one-quarter of that of the ignition voltage and then the gate of DRIVER FET 68 will then again be shorted.

WASH CYCLE CIRCUIT

The wash cycle circuit permits turning ON the wiper motor 36 when the pushbutton 12A of column switch 12 is pressed. Upon pressing switch 12A, the wash pump 18 of FIG. 1 operates and the ignition voltage is supplied across capacitor 140 charging it up to the ignition voltage and the diode bus 56 goes to the ignition voltage causing the non-inverting input of comparator 60 to be at a greater potential difference than the inverting input. Hence, the output of comparator 60 will open permitting the charge pump to act to cause DRIVER FET 68 to conduct and cause the power to apply across the wiper motor 36 to operate the motor.

Upon release of pushbutton 12A, capacitor 140 discharges through resistor 142 causing the diode bus voltage to decay to a voltage below that of a voltage at the inverting input of comparator 60. Hence, the output of comparator 60 will go to ground which grounds the gate of DRIVER FET 68 and turns off the ignition voltage to wiper motor 36.

MIST CIRCUIT

The mist circuit 144 permits the operator to press a momentary contact-type switch 17 to make the wiper motor 36 operate for one wipe cycle. Through the closed contact of switch 17, ignition voltage routes through J42 pin 2 and then to the diode bus 56 to cause a HIGH signal at the non-inverter input of comparator 60 and an open output. The DRIVER FET 68 turns ON momentarily to cause the wipe cycle.

HYSTERESIS

Figure 3:
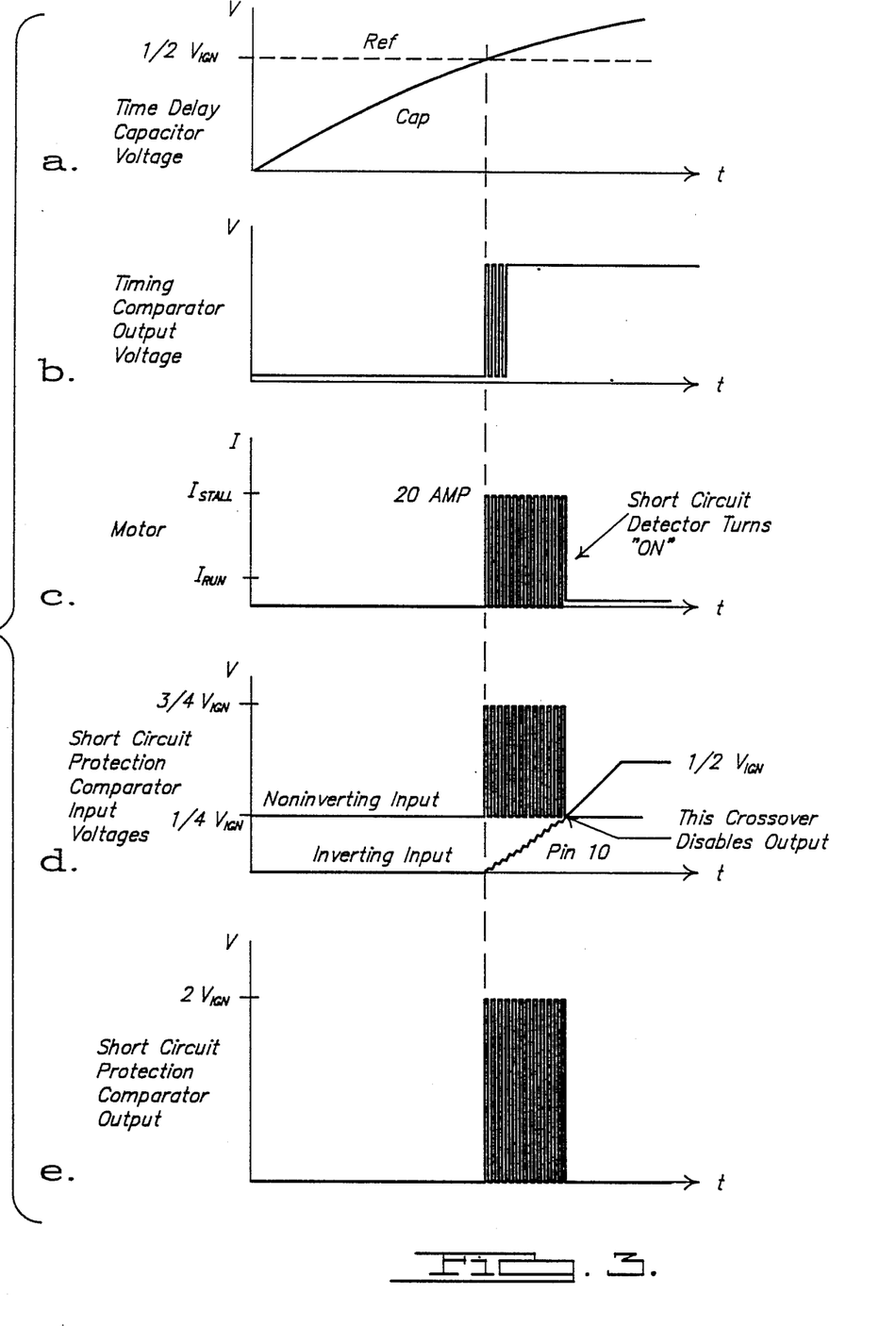

Direct current (DC) hysteresis; i.e, positive feedback, has been added to the level detecting comparators of system 10 to increase tolerance to noise voltages on the inverting input terminals. Without hysteresis, these noise voltages cause multiple switching to occur on slow input transitions. FIG. 3 (b–e) depict noise voltages caused by a slow input transition of the charging voltage of capacitor 82 applied to the non-inverting terminal of comparator 85 in the time delay between two wipes circuit 79 (FIG. 3a).

Without positive feedback associated with comparator 85, capacitor 82 starts charging, as in FIG. 3a, when the wiper 36B contacts ground post 36G of the park switch 36A. The output of comparator 86 remains at ground until the charge on capacitor 82 places a voltage at the non-inverting input that exceeds the voltage at the inverting input.

When the output of comparator 86 switches HIGH, bus 56 goes HIGH, the output of comparator 86 opens enabling the output of charge pump 60 and, DRIVER FET 68 turns ON and drives motor 36.

Initiating the drive of motor 36 causes noise transients throughout system 10. At start-up, motor 36 stalls causing alterations in the voltage levels in system 10. The input voltages on both the inverting and non-inverting inputs of comparator 86 goes into oscillations which yields an output signal that looks much like that in FIG. 3b.

The input signal to motor 36 reacts much like that depicted in FIG. 3c.

With the noise in system 10, the short circuit protection circuit 118 reacts. The noise on bus 56 affects the inverting input of comparator 120 while the output line from motor 36 affects the non-inverting input as depicted in FIG. 3d. When the voltage on the inverting input of comparator 120 exceeds that which appears on the non-inverting input, the output of the comparator causes a ground signal at junction 114 which cuts off both the DRIVER FET 68 and the Darlington 122 that controls the gate voltage of PARKING FET 124.

FIG. 3e depicts the output of comparator 120 of the short circuit protection circuit 118 before and after disabling the input voltage to motor 36.

To sharpen the performance of the time delay between two wipes circuit 79 to make the output of comparator 86 move more rapidly towards HIGH when capacitor 88 charges to a voltage greater than that at the inverting input and to make the output fall more rapidly towards ground when the motor starts and the wiper 36B applies ignition voltage to the park line to cause the Darlington transistor 84 to turn ON, resistor 83 provides positive feedback. This action guarantees a difference in thresholds at the input to comparator 86.

When the wiper arm 36B of switch 36A goes to ground post 36G and capacitor 82 charges up to a value above the inverting input, the output of comparator 86 goes HIGH and resistor 83 effectively switches across resistors 80, 87 and the potentiometer 12C of column switch 12 having the effect of raising the voltage at the noninverting input which increases the difference in voltage between the inputs of the comparator, thereby making the output of comparator 86 move more rapidly toward HIGH. This raised voltage at the noninverting input of comparator 86 overcomes the transient noise generated when motor 36 is initially driving ON. This action removes the noise depicted in FIGS. 3b, c, and d at the input of comparator 86, at motor 36 and at the input of comparator 120 of the short circuit detection circuit 116 respectively.

Figure 4:
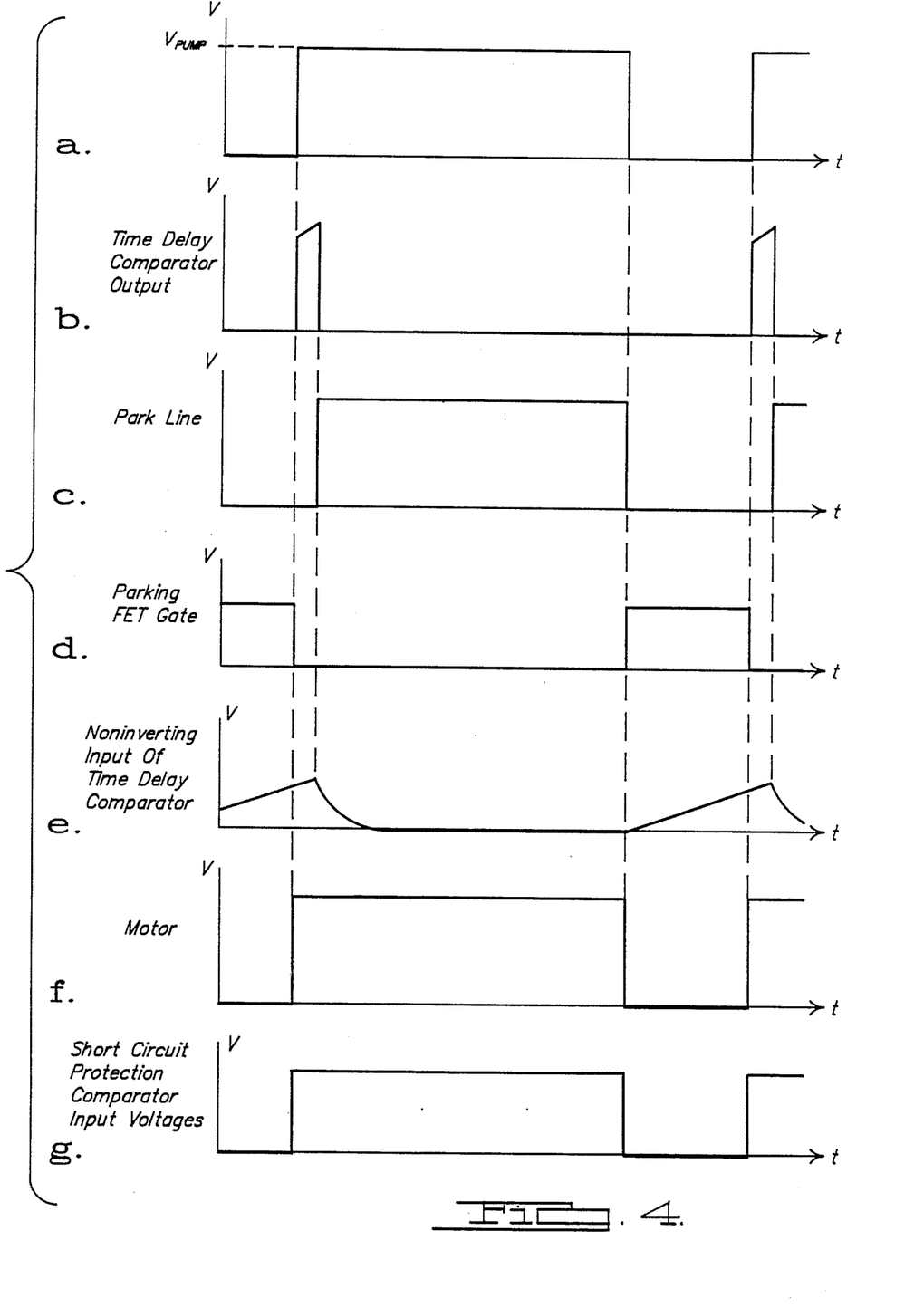

The waveform at these inputs after hysteresis now looks much like what is depicted in FIG. 4 b, f and g respectively.

When wiper arm 36B moves off of ground terminal 36G and onto the circular ignition voltage port 36C, the PARK line routes ignition voltage to the base of Darlington transistor 84 turning it ON causing the voltage at junction 88 to approach ground potential rapidly which causes the voltage at the noninverting input of comparator 86 to fall below the inverting reference voltage. The output tends towards ground. The feedback resistor 83 in series with resistor 87 effectively connect across resistor 81 having the effect of lowering that resistance path, moving the output of comparator 86 toward ground more rapidly. When the output of comparator 86 goes HIGH, bus 56 goes HIGH causing comparator 60 to enable DRIVER FET 68. Hence, the time delay between two wipes circuit 79 acts rather like a wall light switch; i.e., it snaps OFF when the noninverting input decreases slightly below the inverting input voltage and ON when it approaches a voltage above the inverting input voltage.

FIG. 4 summarizes the operations between the time delay between two wipes circuit 79 and the driving and braking of motor 36. FIG. 4e depicts the charging voltage on capacitor 82 when the PARK line routes a LOW signal from ground post 36G to circuit 40 (FIG. 4c). After the voltage on capacitor 82 exceeds the inverting input of comparator 86, the PARK line goes HIGH, the comparator output goes HIGH (FIG. 4b) and the charge pump provides voltage to DRIVER FET 68 (FIG. 4a) turning DRIVER FET 68 ON. Motor 36 operates (FIG. 4f) and PARKING FET 124 cuts off (FIG. 4d). When the wiper arm 36b of park switch 36a returns to ground post 36g, the above cycle repeats.

REVERSE BATTERY VOLTAGE PROTECTION

Another feature of the present invention concerns reverse battery protection. Normally, for reverse battery protection, a diode in the battery line handles the total stall current of the motor in the forward direction. By placing diode 150 in the forward direction with the drain current to the PARKING FET 124, the stall current does not affect the stall current, but diode 150 handles transient currents when the motor 36 is braked when PARKING FET 124 turns ON. Diode 150 handles peak currents during braking, but it doesn't have to handle continuous currents as it would have to if diode 150 was placed in the battery line.

It is to be understood that the above-described embodiment is mainly illustrated of the principles of the invention. Although a partially discrete, partially integrated embodiment is disclosed, a totally integrated embodiment equivalent could also be developed. One skilled in the art may make changes and modifications to the embodiments disclosed herein and may devise other embodiments without departing from the scope and essential characteristics thereof.

We claim:

1. A windshield wiper drive motor and washer pump motor controller system furnishing an intermittent wipe mode of operations with selectable variable delay periods between successive wiping cycles, a first-wipe-before-delay mode, a wipe-after wash mode and a mist mode of operation of said wiper motor, said wiper motor being energized from a source voltage of electrical potential difference and having a motor switch which mechanically couples to the wiper motor, the motor switch providing digital voltage signals in response to movement of a rotor of the wiper motor, said variable delay periods being selected using a double pole selector switch operable from an OFF to an ON position through a range of selectable delay period positions wherein one of the poles of the selector switch cooperates with and changes the resistance value of an adjustable resistance device which controls the time delay period during which the wiper motor is de-energized between successive wiping cycles in the intermittent wipe mode of operation thereof, said wipe-after wash mode being initiated by a wash switch connected at one side to one side of said source voltage of potential difference and at another side to one side of said washer pump motor to activate the washer pump motor upon actuation of said wash switch, and said mist mode being initiated by a mist switch which causes the wiper motor to make a wipe cycle, said system comprising:
   (a) means for driving said wiper motor in response to adjustment of the double pole selector switch, activation of the wash switch or the mist switch;
   (b) means for braking said wiper motor in response to delay periods established by adjusting the double pole selector switch, deactivating the double pole selector switch, the wash switch or the mist switch;
   (c) short circuit protection circuit coupled between said wiper motor driving means and said wiper motor braking means for braking the wiper motor in response to an input and output of the wiper motor being shorted; and
   (d) means for protecting said system from reverse directed source voltage currents.

2. Apparatus in accordance with claim 1 wherein said motor driving means includes:
   (a) an oscillator means having an input connected to receive the potential difference of said source voltage and producing therefrom, at an output terminal, an oscillating voltage signal of a chosen frequency;
   (b) a charge pump means connected to receive the potential difference of said source voltage and adapted to receive the oscillating voltage signals from said oscillator means and producing therefrom, at an output terminal, a voltage signal of an amplitude which approximates a multiple of an amplitude of said source voltage; and
   (c) a driving transistor device having a drain terminal connected to one side of said source voltage and a gate terminal connected to the output of said charge pump means for producing, at a source terminal, a potential difference having an amplitude that approximates the difference between the output voltage of the charge pump means and the potential difference of the source voltage, the voltage at said source terminal being coupled to an input terminal of said wiper motor for driving said wiper motor.

3. Apparatus in accordance with claim 2 wherein said motor braking means includes:

(a) a parking Darlington transistor device having a base terminal for receiving a switched signal, a collector and emitter terminal connected across the potential difference of said source voltage, said emitter terminal being grounded and producing therefrom, at an output terminal, a current signal indicative of a HIGH or LOW level switched signal; and (b) a park or braking transistor device having a drain terminal connected to the source terminal of said driving transistor device and to the input terminal of said wiper motor and having a source terminal grounded and producing therefrom a grounded current signal to said wiper motor input terminal when said switched signal is LOW.

4. Apparatus in accordance with claim 3 wherein said motor driving means and said motor braking means are coupled to an output terminal of a first level detecting comparator means which provides said switched signals to said gate terminal of said driving transistor device and said base terminal of said parking Darlington transistor device in response to signals on a noninverting input terminal, an inverting input terminal of said first comparator means receiving a reference signal divided down from the potential difference of said source voltage.

5. Apparatus in accordance with claim 4 wherein the noninverting input terminal of said first comparator means receives a control signal from an output terminal of a diode bus, said diode bus having input terminals connected to a first wipe circuit, a time delay circuit, a hold circuit, a wash cycle circuit and a mist circuit.

6. Apparatus in accordance with claim 5 wherein said first wipe circuit has an input terminal adapted to receive an output voltage from across the adjustable resistance device of said selector switch and producing therefrom at an output terminal connected to the diode bus, a differentiated voltage output signal that decays towards the ground potential, the differentiated voltage output signal causing the diode bus to provide a HIGH signal to the noninverting input of said first comparator means, said first comparator means producing therefrom a HIGH output signal which inhibits the parking Darlington transistor device but enables the gate terminal of the driving transistor device causing the wiper motor to operate as long as the differentiated voltage output signal remains above the reference voltage at the noninverting input of the first comparator means.

7. Apparatus in accordance, with claim 6 wherein said hold circuit has an input terminal connected to receive an ignition voltage signal from said motor switch as said wiper motor operates and producing therefrom at an output terminal connected to the input terminal of the diode bus a signal above the reference voltage at the input of the first comparator means for keeping said driving transistor device enabled for a first wipe cycle.

8. Apparatus in accordance with claim 7 wherein said wash cycle circuit has an input adapted to receive at an input terminal, the potential difference of the source voltage when the wash switch is operated and producing therefrom at an output terminal an integrated voltage signal which reaches an amplitude of approximately the source voltage that routes to an input of the diode bus causing the voltage at the noninverting input of the first comparator means to exceed the reference voltage at the inverting input and after the wash switch is released, a chosen number of wipe cycles occur.

9. Apparatus in accordance with claim 8 wherein said time delay circuit includes a second Darlington transistor circuit, an RC circuit and a second comparator means, said second Darlington transistor circuit has an input base terminal adapted to receive a reduced voltage source signal and the digital pulse signal from the wiper motor switch output terminal, said second Darlington transistor circuit also having an emitter terminal connected to the ground terminal of the source voltage and a collector terminal connected to an output terminal of the RC circuit, said RC circuit having an input resistor connected between the output terminal of the adjustable resistance device of the selector switch and the output terminal of the RC circuit, and having an input capacitor connected to ground and producing therefrom at the output terminal an integrated voltage signal in proportion to, the potential difference across the adjustable resistance device of the selector switch when the motor switch issues a LOW digital signal and producing a ground signal when the motor switch issues a HIGH digital signal, said second comparator means receiving the integrated voltage signal or ground signal and producing at an output terminal a logic HIGH signal in response to the integrated voltage signal when the integrated voltage signal exceeds the reference voltage at the inverting input of said second comparator means or a logic LOW signal in response to the ground signal.

10. Apparatus in accordance with claim 9 wherein said second comparator means includes positive feedback so as to produce hysteresis resulting from the difference between a first threshold voltage applied to the noninverting input when the inverting input voltage signal causes a logic HIGH output signal and a second threshold voltage applied to the noninverting input when the inverting input voltage signal causes a logic LOW output signal.

* * * * *